Nov. 18, 1958 VAN H. HITCH 2,860,583
ICE CREAM MOLD
Filed Oct. 24, 1956
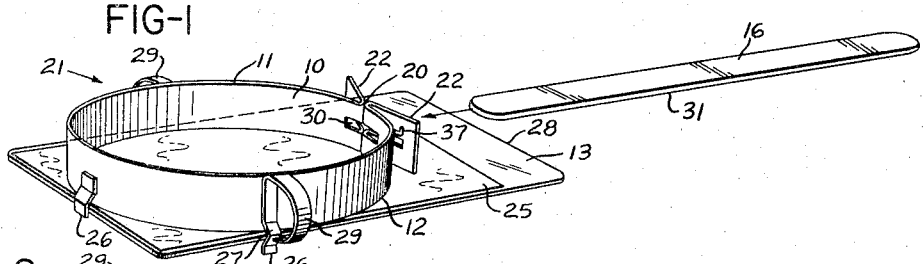
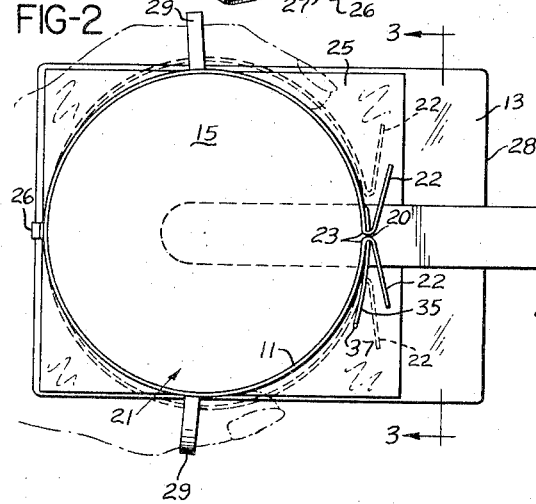
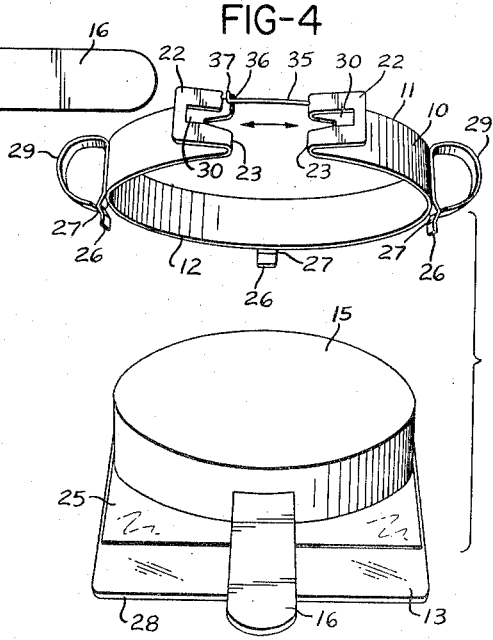
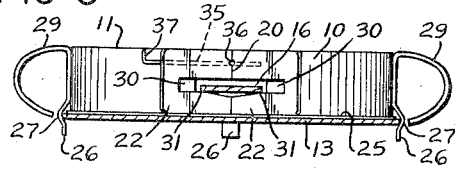
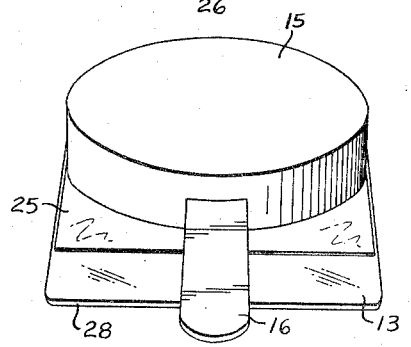
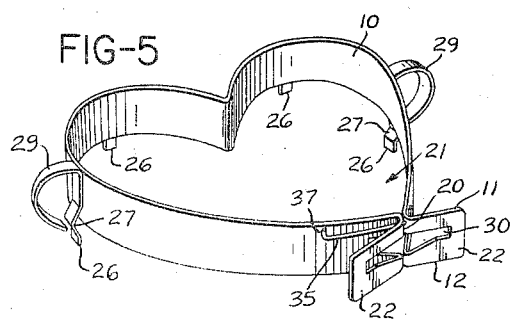
INVENTOR.
VAN H. HITCH
BY
ATTORNEYS

United States Patent Office 2,860,583
Patented Nov. 18, 1958

2,860,583

ICE CREAM MOLD

Van H. Hitch, Dayton, Ohio

Application October 24, 1956, Serial No. 618,061

4 Claims. (Cl. 107—19)

This invention relates to devices for shaping food products, and more particularly to a form for shaping ice cream or the like on a stick preparatory to freezing it thereon.

Products of this type are made and sold widely in the so-called soft ice cream business of the type conducted under such trade names as Dairy Queen, Frozen Custard and the like, sometimes being covered with an edible covering such as chocolate or coconut. The products are customarily prepared during otherwise slack periods by forming them, stacking a number on a tray preparatory to freezing, with the individual products separated by sheets of wax paper, foil or the like, and freezing the batch so prepared.

The mixture from which the products are formed is already frozen and accordingly has sufficient body or stiffness to hold its shape temporarily, and it is therefore possible to make the products without a mold or form. Their uniformity and appearance can be substantially improved, however, and they can be made substantially more efficiently and quickly, if such a form is used.

A primary object of the present invention is to provide a form for molding the product in which the stick may be inserted into predetermined position in the product, and the product and stick may then be removed from the form without disturbing the stick from its position in the product.

Another object of the invention is to provide such a form in which the individual products may be shaped directly on the underlying separating sheet, which may be removed from the form with the food product to facilitate stacking and freezing.

A further object is to provide such a form in which individual such products may be quickly and efficiently formed and released on a production basis.

Additional objects of the invention will be apparent from the following description, the accompanying drawings and the appended claims.

In the drawings—

Fig. 1 is a perspective view showing a form in accordance with the invention in closed position with a stick in position for insertion into the product;

Fig. 2 is a plan view of the form of Fig. 1 in use in closed position with the stick in place in the product, and showing also the open position of the form indicated in dotted lines;

Fig. 3 is a sectional view on the line 3—3 of Fig. 2;

Fig. 4 is a perspective view of the form in open position, partly in section to show a detail of construction, showing the product released from the form ready for freezing; and Fig. 5 is a perspective view showing a form in accordance with the invention for a product of heart-shaped contour.

Referring to the drawings, which illustrate preferred embodiments of the invention, Figs. 1 and 2 show a form including a molding rim 10, having upper and lower edges 11 and 12, received on a flat base or plate 13 in position for receiving soft ice cream, sherbert or the like to be formed into a product 15 of the desired contour and fitted with a stick 16 on which it is to be frozen into the product in a position substantially parallel to the plane of the base 13, as shown in Fig. 4 with the rim removed.

Molding rim 10 is shaped in the contour of the product to be formed, and is split as indicated at 20 providing for movement on base 13 between an open position (as indicated in dotted lines in Fig. 2) and a closed position. The ends of the rim are turned outwardly at split 20 dividing it into a molding portion indicated by the numeral 21 and a pair of wings 22 extending outwardly from the surface of the rim, with the ends of the molding portion at split 20 forming a pair of opposed contacting surfaces 23 between the upper and lower edges 11 and 12 of the rim.

Rim 10 is separable from base 13, providing for insertion of a thin underlying sheet 25 of waxed paper, foil or the like between the base and the lower surface of the product, and has a plurality of tabs 26 extending below the lower edge 12 of the rim, formed to include notches 27 for receiving plate 13. The size of the rim and base are coordinated so that when the rim is received on the base in closed position the tabs will grip base 13 in supporting relation in notches 27, and when in open position will release it, and tabs 26 are so placed as to grip the base on three edges leaving its remaining edge 28 free, and to fix the position of the rim on the base.

The rim is provided also on its outer surface with finger grips 29 for receiving the fingers of the operator and to prevent the rim from slipping in use. These grips may conveniently be formed integrally with the two tabs 26 and welded or soldered to the outer surface of the rim.

Rim 10 should be formed from a resilient rust-resistant material which at the same time has a hard smooth surface and may readily be cleaned and sterilized, such as stainless steel or a suitable plastic, and is preferably a single integral piece biased in open position, although could if desired be hinged opposite split 20.

Surfaces 23 are provided at the split with relatively flat slots 30 intermediate upper and lower edges 11 and 12 of the rim, extending in a generally circumferential direction, opposed to each other and positioned to align and mate when the molding rim is pressed closed. In the closed position of the rim, the opposed mated slots thus form a single aperture located generally at the central portion of the circumference of the product, through which stick 16 may be inserted into its desired predetermined position in the product. Inasmuch as the mixture is partially frozen, the product has sufficient stiffness or body to retain the stick in the position in which it is placed, and also to retain its shape after removal from the form or mold until it is frozen on the stick.

Notches or slots 30 should preferably be formed with their lower edges slanting downwardly in a direction from upper edge 11 at their inner closed ends toward their open ends at the respective surfaces 23, and the dimensions of the slots and their position in rim 10 and in wings 22 are coordinated with each other and also with the predetermined dimensions and desired position of stick 16 in the product. Thus when the molding rim is pressed into closed position, slots 30 will coincide or mate to form a guideway for urging the stick into desired position in the product. By reason of the downward slant in the lower edges of slots 30, the bottom of the guideway is V-shaped.

To facilitate aligning the respective surfaces 23 and insure accurate alignment of slots 30 to form a single guideway in the closed position of the rim, cooperating means are provided associated with the contacting surfaces for indexing the surfaces in proper alignment with respect to each other. These may conveniently be in the form of a pin 35, having one end secured to rim 10 at one side of split 20 and passing through an aperture 36 in the rim on the other side of the split, and having a stop 37 at its free end for limiting the extent to which rim 10 may be opened.

The method of using the ice cream mold is readily apparent from the drawings and the foregoing description. The operator grasps molding rim 10 in one hand with a finger and thumb in the finger grips 29. With his free hand, he places the separating sheet 25 on base 13 and slides the base with the sheet thereon beneath the rim, in position between tabs 26.

As the rim is pressed into closed position, the tabs grip the base plate in notches 27, thus forming a secured closed mold supported in one hand of the operator ready to receive the product, leaving the operator's other hand free. The mold is then filled with the mixture to be frozen, and the operator may smooth off the top with stick 16 and insert the stick into the product through the aperture formed by slots 30, pressing the stick slightly downward. The stick is necessarily urged and guided by the surfaces of the slots into position in the product, as desired, with the free edge 28 of the base plate providing an indicator for the extent of insertion.

The operator then supports the product and its separating sheet on the base plate with his free hand and with his other hand releases the molding rim which by reason of its resiliency opens at split 20, and the product on its separating sheet, with the stick in position therein, may be slid into position on the freezing tray. Since the bottom of the guideway is V-shaped, the stick being pressed downwardly against it contacts the edges of slots 30 at the outer edges 31 only of the lower surface of the stick. The only possible movement of the rim from its closed position being toward the open position of the molding rim and thus away from the stick, immediately the molding rim is opened to remove the product the stick is wholly free from contact with the mold, and may be withdrawn through split 20 as the product is removed from the mold without disturbing the stick from the position in which it has been placed in the product.

This process is then repeated until the desired number of products has been made. After freezing, the products may, if desired, be dipped into a coating material such as chocolate or the like, and packaged for sale.

By means of molding rims in accordance with the invention an operator can, after a little practice, form products of uniform weight and appearance at the rate of two or three a minute. As will be apparent, furthermore, molding rims of a variety of contours may be provided for use on the same base. These may be in the form of figures, animals and the like appropriate to the various holidays throughout the year, and the device accordingly forms a valuable device for use in connection with the soft ice cream business.

While the forms of device herein described constitute preferred embodiments of the invention, it is to be understood that the invention is not limited to these precise forms of article and that changes may be made therein without departing from the scope of the invention, which is defined in the appended claims.

What is claimed is:

1. A form for shaping a product on a stick to be frozen thereon, comprising a base portion, a molding rim received on said base portion and separable therefrom, said rim having a split therein providing for movement of said rim on said base between an open position and a closed position, said rim in closed position being shaped in the contour of said product, means on said rim for releasably positioning said rim in predetermined relation on said base, said positioning means gripping said base in supporting relation to said rim in the closed position of said rim and being adapted for complete removal from said rim of said base with said product thereon in the open position of said rim, the ends of said rim at said split having opposed mating slots intermediate the upper and lower edges of said rim, said slots in the closed position of said rim forming an aperture for insertion of said stick therethrough into predetermined position in said product and in the open position of said rim providing for withdrawal of said product on said base from said rim without disturbing said stick from its position in said product.

2. A form for shaping a product on a stick to be frozen thereon, comprising a base portion, a molding rim received on said base portion and separable therefrom, said rim having a split therein providing for movement of said rim on said base between an open position and a closed position, said rim in closed position being shaped in the contour of said product, means on said rim for releasably positioning said rim in predetermined relation on said base, said positioning means gripping said base in supporting relation to said rim in the closed position of said rim and being adapted for complete removal from said rim of said base with said product thereon in the open position of said rim, the ends of said rim at said split being turned outwardly forming opposed contacting surfaces across said split and wings extending outwardly from said surfaces, said surfaces having opposed mating slots intermediate the upper and lower edges of said rim positioned to form in the closed position of said rim a guideway for urging said stick into predetermined position in said product substantially parallel to the plane of said base and in the open position of said rim an aperture for withdrawal of said product on said base from said rim without disturbing said stick from said predetermined position in said product.

3. A form for shaping a product on a flat stick of predetermined dimensions to be frozen thereon, comprising a base portion, a molding rim received on said base portion and separable therefrom, said rim having a split therein providing for movement of said rim on said base between an open position and a closed position, said rim in closed position being shaped in the contour of said product, means on said rim for positioning said rim in predetermined relation on said base, said positioning means gripping said base in supporting relation to said rim in the closed position of said rim and being adapted for quick release of said base and said product in the open position of said rim in a one-handed operation, the ends of said rim at said split being turned outwardly forming opposed contacting surfaces across said split and wings extending outwardly from said surfaces, said surfaces having opposed relatively flat mating slots intermediate the upper and lower edges of said rim with the lower edges of said slots slanting downwardly in a direction from the upper edge of said rim at the inner closed ends of said slots toward their open ends at said surfaces, said slots being positioned and dimensioned with respect to said predetermined dimensions of said stick to form in the closed position of said rim a V-shaped guideway for urging said stick into predetermined position in said product with said guideway in contacting relation with said stick at the outer edges of the lower face of said stick only, providing for breaking contact of said stick with said guideway immediately upon opening of said rim and withdrawal of said stick through said split without disturbing said stick from said predetermined position in said product.

4. A molding form for shaping a food product superimposed on a separating sheet and positioning a stick in predetermined position in said product preparatory to freezing, comprising a base portion, a generally annular molding rim separable from said base portion and securable thereon in predetermined position to define therewith a closed-bottom mold, said rim having a transverse split therein providing for distortion thereof between a closed position wherein the ends of said rim are engaged at said split with the contour of said rim forming the outline of said product, and an open position wherein said rim is expanded for complete release and removal from said rim of said base portion with said molded product and separating sheet, and means for releasably securing said rim on said base in the closed mold-forming position thereof in said predetermined relation, said rim at said split having a slot therein intermediate the upper and lower edges of said rim, said slot in the closed position of said rim forming a guideway for positioning said stick in said product in said predetermined position, said rim in the open position thereof providing for passage of said stick between its open opposing ends without disturbing said stick from said predetermined position during release and removal of said base and said product.

References Cited in the file of this patent

UNITED STATES PATENTS

| | | |
|---|---|---|
| 559,788 | Perrottet | May 5, 1896 |
| 1,888,739 | Sanders | Nov. 22, 1932 |
| 2,015,097 | Bowman et al. | Sept. 24, 1935 |
| 2,283,380 | MacManus | May 19, 1942 |
| 2,604,058 | Orange | July 22, 1952 |